INVENTORS.
SABURO YOSHIMURA
HISAAKI YOKOI
KOICHIRO SATO
MOTOO YAMANE
BY Kurt Kelman — AGENT

United States Patent Office 3,592,725
Patented July 13, 1971

3,592,725
COMPOSITE SHEET OF A THERMOPLASTIC SYNTHETIC RESIN FILM WITH SOLID PARTICLES PARTIALLY EMBEDDED IN THE SURFACE OF THE FILM
Saburo Yoshimura, Hisaaki Yokoi, Koichiro Sato, and Motoo Yamane, Tokyo, Japan, assignors to The Kokusaku Pulp Industry Co., Ltd., Tokyo, Japan
Filed Dec. 23, 1966, Ser. No. 604,446
Claims priority, application Japan, Dec. 29, 1965, 41/81,317
Int. Cl. B32b 19/02
U.S. Cl. 161—162        4 Claims

ABSTRACT OF THE DISCLOSURE

The surface of a synthetic resin film is made suitable for writing or printing by providing a visibly continuous layer of finely divided particles of clay, talc or cellulosic pulp on the film, the particles being partially embedded in the resin film.

---

The present invention relates to an improved composite thermoplastic synthetic resin film having a continuous rough or matted surface coating layer comprising particles of a solid material on at least one surface, and more particularly, to an improved composite thermoplastic synthetic resin film of the above type which is opaque and can be employed for writing and printing purposes.

Generally, thermoplastic synthetic resin films are hydrophobic and oil repellent and have smooth surfaces, and therefore, it is difficult to write or print on such films. In order to adapt thermoplastic synthetic resin films for writing and printing, such films have been subjected to corona discharge treatment, but when thus treated films were employed for printing purposes, specific inks which were specified to be exclusively employed in connection with such resin films were required. And even with such specific inks it has been difficult to obtain satisfactory printing results.

Also, thermoplastic synthetic resin films are generally transparent, but when such films are employed for some purposes the films are required to be opaque. Hitherto, in order to obtain opaque thermoplastic synthetic resin films, the films have been formed by incorporating a dulling agent such as titanium oxide into the essential ingredients of the synthetic resins. In another prior art method, thermoplastic synthetic resin films have been formed so as to have bubbles in the structures of the films.

Therefore, one object of the present invention is to provide a composite thermoplastic synthetic resin film which readily accepts writing and printing and also has antistatic charge and opaque properties.

Another object of the present invention is to provide a composite thermoplastic synthetic resin film having at least one surface in which fine particles of a solid material are partially embedded and form a visibly continuous rough-surfaced coating layer on said surface.

The above and other objects and advantages of the present invention will be more readily apparent from the following description when read in connection with the accompanying drawings in which.

Figure 1:
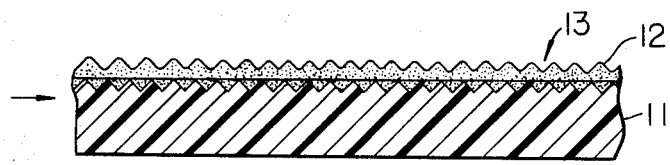
FIG. 1 is a fragmentary sectional view on an enlarged scale of a composite thermoplastic synthetic resin film according to the present invention.

According to the present invention, the resinous materials from which the base film is formed include, for example, homopolymers of ethylene, propylene, vinyl chloride, vinylidene chloride, styrene, and copolymers and blends of these materials. One surface of the base film carries finely divided particles of inorganic solid materials, for example, such as clay or talc, or finely divided particles of organic material, for example, such as cellulosic pulp so as to form a visibly continuous rough-surfaced coating layer on the one surface of the base film. The rough-surfaced coating layer forming particles are applied onto one surface of the base film of the thermoplastic synthetic resin film by means of an applicating means which is adapted to press one matted surface of a particle carrier, on which the particles of the coating layer forming solid material are deposited, against the surface of the base film while the film is advancing in a soft state. The matted surface may be provided on a carrier which may be either in the form of a sheet or a roll. When the matted surface is provided on a roll-type carrier, the matted surface can be obtained by disposing a sheet of metal, paper or cloth which has one matted surface around the periphery of a cooling roll and/or a presser roll with the matted surface disposed on the top, or alternatively, the matted surface can be obtained by roughing the peripheral surface of the cooling roll and/or presser in a conventional manner. When the matted surface is to be provided on a sheet metal or on a metallic roll, the matted surface can be formed on the sheet metal and roll by blasting sand, grits, or molten metal fragments. On the other hand, when the matted surface is to be provided on a sheet of paper or cloth, the matted surface can be formed on one surface of the sheet of paper or cloth by gluing particles of any suitable mineral onto the one surface of the sheet of paper or cloth, or a sheet of emery paper may be glued onto one surface of the sheet of paper or cloth with the emery surface of the emery paper disposed on the top. In all cases, the matted surface should have a uniform distribution of alternate convexed and concaved portions thereon, but it is not necessary that such alternate convexed and concaved portions exist throughout the whole area of one surface of the sheet or roll surface.

Although the diameter for each of these convexes and concaves primarily depends upon the size of the particles of the coating layer forming material to be employed, it is preferably within a range from several microns to several hundred microns. The average size of the coating layer forming particles is over 1 micron with the preferable size, of 10–20μ for talc and clay and less than 200 mesh for cellulosic pulp.

The coating layer forming particles deposited on the matted surface of a carrier are retained on the matted surface due to the mutual frictional force existing between the particles themselves and that existing between the particles and the carrying matted surface so as to form a rough-surfaced thin coating layer thereon. When the coating layer forming particles are properly deposited on the matted surface of a carrier, the concaves are completely filled with the particles while the convexes are covered by a very thin layer of the particles having a thickness just sufficient to cover the crests of the convexes. The thus deposited coating layer forming particles are then transferred onto and embedded in one surface of a continuous sheet of film forming thermoplastic synthetic resin which has been just extruded by an extruder and is advancing in a predetermined path in an unsolidified state and the coating particles are bonded to the base film as the latter solidifies whereby a desired composite thermoplastic synthetic resin film can be obtained. The temperature for melting the thermoplastic synthetic resin material, the pressure at which the presser roll transfers and embeds the coating layer forming particles onto and into the adjacent surface of the base resinous film and the size of the layer forming particles should be precisely controlled in order to obtain a desired composite film. These factors can be easily determined by those skilled in the art through practical operations and, therefore, these factors are not specified herein, but to take an example, when the coating layer forming particles are applied on one surface of a polypropylene film having a melt index of 8 at a linear pressure of 22 kg./cm., the temperature of the polypropylene should be within the range 200° C.–300° C., preferably within the range 200° C.–250° C. The higher the melting temperature for a given resin, the lower is the linear pressure for applying the coating layer forming particles onto the resin, and the higher the melt index of any given resin, the lower is the pressure for applying the particles onto the resin. The thus obtained composite resin film not only has a rough surface, but the particles of the applied coating layer define micro-voids therebetween and the thus treated resin film can retain printing ink satisfactorily and rapidly absorb the ink in the coating layer. The base film may be a resin film or a resin film laminated to paper, cloth and metal foil. When writing or printing is applied to the thus treated resin surface and there are noticed any defects such as ink blotting and the like, the resin film can be subjected to any suitable surface treatment to eliminate such defects. To attain this object, for example, any conventional paper sizing agent such as rosin, wax, petroleum resin or derivative thereof is dissolved in an organic solvent which is inert to both the film resin and sizing agent and the solution is applied onto the particle coated surface of the film. The thus treated film surface has improved capabilities for writing and printing. The base film can be colored as desired by previously adding any coloring material such as organic or inorganic pigment to the ingredients of the resin base film.

Figure 2:
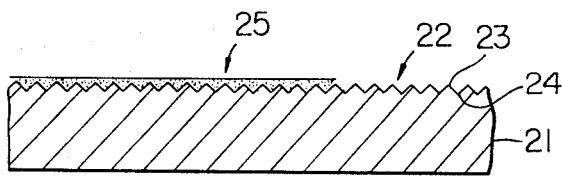
FIG. 2 is a fragmentary view on an enlarged scale of a solid material particle carrier on one matted surface of which particles of a solid material are deposited and which shows the distribution of said particles on said matted surface.

FIG. 1 shows a composite thermoplastic synthetic resin film comprising a resinous base film 11 having on one surface a rough surfaced-continuous coating layer 13 formed of finely divided particles of a solid material 12 with some of them embedded in the surface of the base film. FIG. 2 shows of a solid material particle carrier 21 in the form of a sheet formed of paper, cloth or metal with a thin layer of solid material particles deposited on one matted surface 22 thereof to be transferred onto the base film 11 by means which will be explained hereinbelow. As seen in FIG. 2, the matted surface 22 has alternate convexed portions 23 and concaved portions 24 and the solid material particles 25 are deposited on the matted surface 22 covering the convexes and concaves in a continuous layer form and retained thereon due to the mutual frictional force between the particles themselves and that between the particles and the carrier 21. According to the present invention, the amount of the solid particles 25 is so selected that the particles may completely fill up the concaves 24 and form a very thin layer just enough to cover the crests of the convexes 23 thereby to render the matted surface 22 substantially even.

Figure 3:
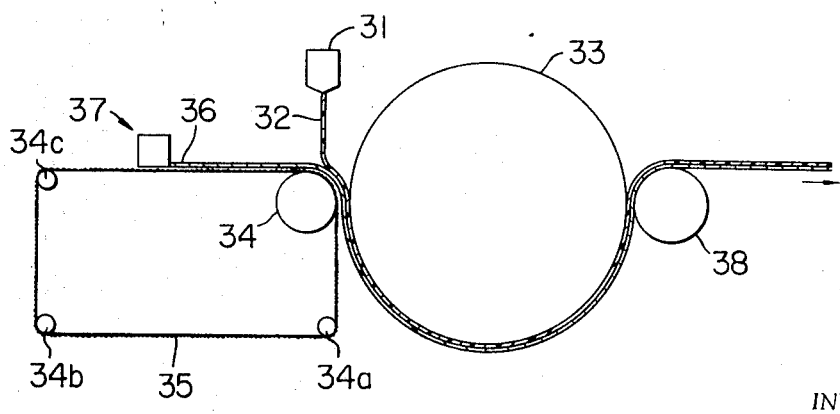
FIG. 3 is a diagrammatic view of apparatus suitably employed for carrying out the present invention.

FIG. 3 diagrammatically shows one form of apparatus for carrying out the present invention to produce a composite thermoplastic synthetic resin film as shown in FIG. 1. In FIG. 3, reference numeral 31 indicates a T-type die which is connected to a suitable resinous material supply source (not shown) for receiving a supply of the resinous material in pellet or powder form from the supply source. The die 31 is adapted to melt a supply of resinous material and extrude the molten resinous material as a sheet or base film through the clearance between the two lips of the die 31. The thus extruded resinous sheet 32 is passed to and through the nip defined by a cooling roll 33 and a smaller diameter presser roll 34 which are positioned below the T-type die 31 in positions for receiving the sheet 32 being extruded from the die 31. The cooling roll 33 has suitable driving means and cooling means incorporated therein (not shown) and the presser roll 34 also has suitable driving means incorporated therein (not shown). As the sheet 32 passes through the nip between the rotating cooling roll 33 and presser roll 34, the sheet is pressed against the periphery of the cooling roll by the pressure of the presser roll while being cooled by the cooling roll and trained over about one half of the periphery of the rotating cooling roll 33. The sheet 32 is advanced in contact with the periphery of the rotating cooling roll 33 to and between the cooling roll and a strip roll 38 which is disposed closely adjacent and facing the side of the cooling roll 33 opposite to the presser roll 34 in a contacting and rotating relation with the cooling roll 33 with the advancing sheet 32 interposed therebetween. The components of the apparatus mentioned just above are well known in the art for melt extruding resinous material, and therefore, detailed explanations of the construction and operation of the apparatus components will be unnecessary.

A solid coating particle carrier 35 in the form of a metallic endless sheet is trained over the presser roll 34 and the carrier has one matted surface for receiving particles of a solid coating material 36 thereon. The particle carrier 35 is further trained over guide rollers 34a, 34b and 34c which form a quadrangular drive mechanism for the carrier 35 in cooperation with the presser roll 34. A solid coating particle applicating means 37 is disposed above the path of the carrier 35 at a suitable point between the presser roll 34 and guide roll 34c and the applicating means is adapted to supply the solid particles 36 onto the matted surface of the carrier 35.

As the resinous sheet 32 is passed to the nip between the cooling roll 33 and presser roll 34, one surface of the resinous sheet is caused to contact the opposing or matted surface of the solid particle carrier 35 just before the sheet enters the nip. Then, the contacting resinous sheet 32 and carrier 35 are pressed against each other while they are passing through the nip defined by the cooling and presser rolls 33 and 34 whereby the particles of coating material 36 deposited on the matted surface of the carrier 35 are transferred onto and partially embedded into the adjacent surface of the resinous sheet 32 as the sheet cools and solidifies while the same is being trained around the periphery of the cooling roll 33. The solid particle carrier 35 is separated from the resinous sheet 32 as they emerge from the lower end of the nip defined by the cooling and presser rolls 33 and 34. The thus coated and separated base film 32 is completely cooled in contact with the periphery of the cooling roll 33 and the film is stripped from the cooling roll by the strip roll 38.

Figure 4:
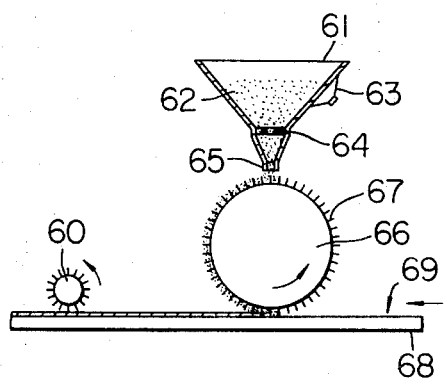
FIG. 4 is a fragmentary diagrammatic view of solid material particle applicating means which may be employed in conjunction with the apparatus of FIG. 3.

In FIG. 4, reference numeral 61 indicates a funnel-shaped hopper for holding a supply of finely divided solid particles 62 to be deposited onto the matted surface of the solid particle carrier. The hopper 61 has a screen 64 in its narrowed intermediate portion between the top and bottom ends and a further narrowed lower portion 65 is formed continuous to the intermediate portion and opens at both the top and bottom ends. A vibrator 63 is mounted at a suitable point on the outer surface of one wall of the upper portion of the hopper 61 for vibrating the hopper so as to accelerate the falling movement of the solid particles through the hopper by gravity. Disposed directly below the open ended lower portion 65 in a light contact relation with the bottom end of the lower portion is a brush roll 66 having a plurality of spaced brushing piles 67 in the periphery of the roll. The width of the brush roll 66 is preferably corresponding to the width of the opening at the bottom end of the lower hopper portion 65. Disposed below and in contact with the brush roll 66 is a flexible solid particle carrier 68 having one matted surface 69 opposite the lower portion bottom opening 65. The solid particle carrier 68 corresponds to the carrier as indicated by reference numeral 35 in FIG. 3. The direction of advancing movement of the carrier 68 is opposite to that in which the brush roll 66 rotates. Thus, the solid particles 62 from the hopper 61 are transferred onto the matted surface of the moving carrier 68 so as to provide a thin particle layer on the matted surface as mentioned hereinabove. If necessary, a second smaller diameter brush roll or rolls 60 may be provided above the path of the carrier 68 at such a level that the second brush lightly contacts the deposited particle layer on the matted surface 69 of the carrier 68 so as to remove any excessive amount of particles from the matted surface and to make the upper surface of the particle layer substantially even.

EXAMPLE 1

In this example, the apparatus of FIG. 3 was employed. Polypropylene of Melt Index 7 in a finely divided particle form was extruded through the conventional T-type die having a lip clearance of 0.6 mm. and an outlet temperature of 280° C. into a continuous resinous sheet or base film. Meantime, on a flexible metal carrier having one matted surface with the average concave diameter of $30\mu$ were deposited talc particles having an average diameter of $10\mu$ so as to form a talc particle layer having a surface density of 2.2 g./m.$^2$. The above resinous sheet was caused to contact the talc layer just before they entered the nip defined by the cooling roll and presser roll and then passed through the nip while being pressed together by means on the presser roll at a pressure of 22 kg./cm. The temperature of the resinous sheet at the time of the contact with the talc particles was 210° C. Until the carrier and resinous sheet have passed through the nip, the talc particles of the talc layer deposited on the matted surface of the carrier had been transferred onto and partially embedded into the opposite surface of the resinous sheet and firmly bonded to the sheet. The thickness of the finished composite film being $80\mu$.

The thus obtained composite thermoplastic synthetic resin film had an excellent printing capability and was opaque. When writing was made by the use of ink on the coated surface of the film, some blotting of the ink was noticed. The composite film is useful for preparing military maps, posters and prints of original drawings.

EXAMPLE 2

The procedure was substantially the same as that of Example 1 except that an additional or second particle applicating mechanism was employed in conjunction with the first particle applicating mechanism. In Example 2, a composite thermoplastic synthetic resin film having cellulosic pulp layers on both the surfaces thereof was produced.

The conditions under which the operation of Example 2 was carried out were as follows:

Polyethylene: Melt Index 8
Die outlet temperature: 270° C.
Lip clearance: 0.6 mm.
Temperature of resinous sheet at the time of contact with coating particles: 200° C.
Linear pressure for applying coating particles against resinous sheet: 22 kg./cm.
Velocity of cooling roll: 25 m./min.
Surface temperature of cooling roll: 35° C.
Concave diameter on matted surface of carrier: $100\mu$ (average)
Size and type of solid particles: Cellulosic pulp passed through 200 mesh screen Surface density of powder layer: 1.8 g./m.$^2$
Thickness of completed composite resinous film: $80\mu$

EXAMPLE 3

In this example, a composite thermoplastic synthetic resin film having a laminated structure in which a resinous base film was sandwiched between a kraft-paper layer and a clay layer was produced. The procedure followed in this example was substantially the same as that followed in Example 1 except that a layer of kraft-paper was applied on one surface of a resinous base film and a clay layer was applied on the opposite surface of the base film.

Conditions under which the operation of Example 3 was carried out were as follows:

Polyethylene: Melt Index 7
Die outlet temperature: 360° C.
Lip clearance: 0.6 mm.
Weight of kraft-paper: 80 g./m.$^2$
Temperature of polyethylene at the time when kraft-paper and clay layers were applied against both the surfaces of resinous film: 290° C.
Linear pressure for applying kraft-paper and clay layers against both the surfaces of resinous film: 22 k./cm.
Velocity of cooling roll: 50° m./min.
Temperature of cooling roll: 35° C.
Type and size of coating powder: Clay powder with $1.5\mu$ diameter (average)
Surface density of clay powder layer: 2.5 g./cm.$^2$
Concave diameter on matted surface of carrier: $20\mu$ (average)

EXAMPLE 4

The composite thermoplastic synthetic resin film obtained by the process of Example 1 was immersed in a solution of 0.2% of a commercially available type paper sizing petroleum resin dissolved in toluene and any excessive amount of solution was removed from the composite film. Thereafter, the composite film was dried at 50° C. Writing was made on the clay-coated surface of the film using ink and it was found that ink-blotting was completely prevented.

What is claimed is:

1. A composite sheet comprising a thermoplastic synthetic resin substrate and a continuous layer of finely divided solid particles on a surface of the substrate, the particles being partially embedded in and at least in part exposed above the substrate surface, said particles being selected from the group consisting of clay, talc and cellulosic pulp.

2. The composite sheet of claim 1, wherein the substrate is a self-supporting film of said resin.

3. The composite sheet of claim 1, wherein the substrate is a film of said resin and the resin film is laminated to a sheet of a material selected from the group consisting of paper, cloth and metallic foil.

4. The composite sheet of claim 1, wherein the continuous layer of finely divided solid particles is provided on both surfaces of the substrate.

References Cited

UNITED STATES PATENTS

| | | | |
|---|---|---|---|
| 2,246,898 | 6/1941 | Sayre | 161—162 |
| 2,909,443 | 10/1959 | Wolinski | 117—16 |
| 3,100,722 | 8/1963 | Herrmann et al. | 117—16X |
| 3,154,461 | 10/1964 | Johnson | 161—168X |
| 3,389,036 | 6/1968 | Rudolph et al. | 161—250X |

PHILIP DIER, Primary Examiner

U.S. Cl. X.R.

161—168, 249; 117—16; 156—244